US011987991B2

(12) United States Patent
Claerhout et al.

(10) Patent No.: US 11,987,991 B2
(45) Date of Patent: May 21, 2024

(54) FLOOR PANEL FOR FORMING A FLOOR COVERING

(71) Applicant: FLOORING INDUSTRIES LIMITED, SARL, Bertrange (LU)

(72) Inventors: Matthias Claerhout, Wielsbeke (BE); Mark Cappelle, Staden (BE); Bryan Rollier, Kanegem (BE); Christophe Naeyaert, Jabbeke (BE)

(73) Assignee: UNILIN BV, Wielsbeke (BE)

( * ) Notice: Subject to any disclaimer, the term of this patent is extended or adjusted under 35 U.S.C. 154(b) by 103 days.

(21) Appl. No.: 17/613,212

(22) PCT Filed: May 15, 2020

(86) PCT No.: PCT/IB2020/054609
§ 371 (c)(1),
(2) Date: Nov. 22, 2021

(87) PCT Pub. No.: WO2020/234711
PCT Pub. Date: Nov. 26, 2020

(65) Prior Publication Data
US 2022/0213694 A1 Jul. 7, 2022

(30) Foreign Application Priority Data
May 22, 2019 (BE) .................................. 2019/5336

(51) Int. Cl.
E04F 15/02 (2006.01)
E04F 15/10 (2006.01)
F16B 5/00 (2006.01)

(52) U.S. Cl.
CPC ...... *E04F 15/02038* (2013.01); *E04F 15/107* (2013.01); *F16B 5/0056* (2013.01);
(Continued)

(58) Field of Classification Search
CPC ............ F16B 5/0056; E04F 2201/0138; E04F 2201/0115; E04F 2201/0146;
(Continued)

(56) References Cited

U.S. PATENT DOCUMENTS 6,536,178 B1 * 3/2003 Pålsson ................... B44C 3/123
52/392
6,647,690 B1 * 11/2003 Martensson ............ E04F 15/04
52/489.1
(Continued)

FOREIGN PATENT DOCUMENTS

CN 101542053 A 9/2009
CN 107075858 A 8/2017
(Continued)

OTHER PUBLICATIONS

International Search Report and Written Opinion from PCT Application No. PCT/IB2020/054609, dated Jul. 9, 2020.
(Continued)

Primary Examiner — Brent W Herring
(74) Attorney, Agent, or Firm — Workman Nydegger

(57) ABSTRACT

A floor panel for forming a floor covering consisting of floor panels which are provided with coupling parts on at least one pair of edges. The coupling parts are made mainly of the material of the floor panel, and the coupling parts are configured such that two of such floor panels can be installed and locked together at the pair of edges via a downward movement and/or via the fold-down principle.

13 Claims, 3 Drawing Sheets

(52) U.S. Cl.
CPC . *E04F 15/02033* (2013.01); *E04F 2201/0138* (2013.01); *E04F 2201/0146* (2013.01); *E04F 2201/0176* (2013.01)

(58) Field of Classification Search
CPC ............ E04F 2201/01; E04F 15/02038; E04F 15/107; E04F 15/02033; E04F 2201/0176; E04F 2201/0153
USPC .. 52/578, 589.1, 590.1, 591.1, 591.3, 592.1, 52/592.2, 590.2
See application file for complete search history.

(56) References Cited

U.S. PATENT DOCUMENTS

| | | | |
|---|---|---|---|
| 7,603,826 B1* | 10/2009 | Moebus | E04F 15/04 |
| | | | 52/592.4 |
| 8,191,334 B2* | 6/2012 | Braun | E04F 15/02 |
| | | | 52/592.1 |
| 8,302,361 B2 | 11/2012 | Braun et al. | |
| 8,375,674 B2* | 2/2013 | Braun | E04F 15/02 |
| | | | 52/592.1 |
| 8,511,040 B2 | 8/2013 | Braun et al. | |
| 9,217,250 B2* | 12/2015 | Perra | E04C 2/40 |
| 9,249,582 B1 | 2/2016 | Anspach et al. | |
| 9,260,870 B2* | 2/2016 | Vermeulen | E04F 15/105 |
| 9,422,727 B2* | 8/2016 | Sjoberg | E04F 15/02011 |
| 9,528,275 B2* | 12/2016 | Cappelle | E04F 15/02038 |
| 9,611,655 B2 | 4/2017 | Anspach et al. | |
| 9,695,851 B2 | 7/2017 | Hannig | |
| 9,816,270 B2 | 11/2017 | Pervan et al. | |
| 9,874,028 B2* | 1/2018 | Boucké | E04F 15/107 |
| 9,885,187 B2* | 2/2018 | Kell | E04F 15/02033 |
| 9,938,727 B2 | 4/2018 | Ceysson et al. | |
| 9,995,045 B2* | 6/2018 | Stevens, Jr. | E04F 15/105 |
| 10,190,611 B2 | 1/2019 | Hannig | |
| 10,280,627 B2* | 5/2019 | De Rick | E04F 15/02038 |
| 10,287,779 B2 | 5/2019 | Ceysson et al. | |
| 10,640,990 B2 | 5/2020 | Ceysson et al. | |
| 10,648,182 B2* | 5/2020 | De Rick | E04F 15/107 |
| 10,697,175 B2 | 6/2020 | Pervan et al. | |
| 10,738,477 B2 | 8/2020 | Hannig | |
| 11,225,800 B2* | 1/2022 | De Rick | E04F 15/02038 |
| 11,319,712 B2 | 5/2022 | Hannig | |
| 11,479,970 B2 | 10/2022 | Pervan et al. | |
| 11,603,668 B2* | 3/2023 | Boucké | E04F 15/02038 |
| 2003/0066588 A1* | 4/2003 | Palsson | E04F 15/107 |
| | | | 156/91 |
| 2004/0123547 A1* | 7/2004 | Grafenauer | E04F 15/02 |
| | | | 52/592.1 |
| 2004/0128934 A1* | 7/2004 | Hecht | E04F 15/181 |
| | | | 52/578 |
| 2004/0250492 A1* | 12/2004 | Becker | E04F 15/04 |
| | | | 52/578 |
| 2009/0133353 A1* | 5/2009 | Pervan | H01F 7/122 |
| | | | 52/747.1 |
| 2010/0293879 A1* | 11/2010 | Pervan | E04F 15/02038 |
| | | | 52/588.1 |
| 2010/0300029 A1 | 12/2010 | Braun et al. | |
| 2013/0008127 A1 | 1/2013 | Braun et al. | |
| 2013/0309441 A1 | 11/2013 | Hannig | |
| 2013/0333182 A1 | 12/2013 | Pervan et al. | |
| 2016/0138274 A1 | 5/2016 | Anspach et al. | |
| 2017/0241136 A1* | 8/2017 | Kell | E04F 13/0889 |
| 2017/0254076 A1 | 9/2017 | Pervan et al. | |
| 2017/0268545 A1 | 9/2017 | Hannig | |
| 2017/0284105 A1 | 10/2017 | Ceysson et al. | |
| 2017/0328072 A1 | 11/2017 | Hannig | |
| 2017/0370109 A1* | 12/2017 | Devos | E04F 15/02038 |
| 2018/0094441 A1* | 4/2018 | Boo | E04F 15/105 |
| 2018/0187423 A1 | 7/2018 | Ceysson et al. | |
| 2019/0017278 A1 | 1/2019 | De Rick et al. | |
| 2019/0218793 A1 | 7/2019 | Ceysson et al. | |
| 2020/0284034 A1 | 9/2020 | Pervan et al. | |
| 2020/0308849 A1* | 10/2020 | Devos | B32B 27/304 |
| 2020/0354970 A1 | 11/2020 | Hannig | |
| 2021/0071429 A1* | 3/2021 | Devos | E04F 15/02038 |
| 2023/0011237 A1 | 1/2023 | Pervan et al. | |

FOREIGN PATENT DOCUMENTS

| | | | | |
|---|---|---|---|---|
| CN | 107109848 A | 8/2017 | | |
| CN | 108026728 A | 5/2018 | | |
| CN | 109025154 A | 12/2018 | | |
| EP | 1367194 A2 * | 12/2003 | ............. | E04F 15/02 |
| EP | 2615221 A1 | 7/2013 | | |
| EP | 3031998 A1 | 6/2016 | | |
| EP | 2615221 B1 | 8/2016 | | |
| WO | 0175247 A1 | 10/2001 | | |
| WO | 2012101171 A1 | 8/2012 | | |
| WO | 2013118030 A2 | 8/2013 | | |
| WO | 2017115202 A1 | 7/2017 | | |

OTHER PUBLICATIONS

Belgian Search Report from corresponding BE Application No. 201905336, dated Jan. 9, 2020.

* cited by examiner

FLOOR PANEL FOR FORMING A FLOOR COVERING

BACKGROUND

The invention concerns a floor panel for forming a floor covering, more particularly for forming a floor covering which can be installed on a substrate.

More particularly, the invention concerns floor panels which can be coupled together by means of mechanical coupling parts.

SUMMARY

The object of the invention is to ensure that a floor covering made of such floor panels can be installed easily, but at the same time provides sufficient stiffness in the floor covering, more particularly, sufficiently rigid connections between the floor panels can be achieved, in combination with production techniques which limit the production cost.

In the first place, the invention concerns floor panels which can be installed using the so-called fold-down technique, in order to meet the specified requirements for simple installation. Here, two of the edges, usually the short edges in the case of oblong floor panels, can be joined together via a downward movement wherein then an interlock is created between the respective edges in a vertical direction perpendicularly to the plane of the coupled panels, and in a horizontal direction in the plane of the coupled panels and perpendicularly to the edges concerned. The interlock in the vertical direction may be achieved with separate elastic locking strips, as is the case for example in WO 2013/118030. This is however costly to implement and apply. To exclude this cost, integral or mainly integral coupling profiles may be used, as is the case for example in WO 2017/115202. Integral coupling parts may have the disadvantage that a compromise must be reached between connection strength and ease of installation; either the connection is too stiff and the floor panels cannot be joined together, or only joined together by damaging them, or the coupling offers too little resistance against unlocking. The quality of the coupling depends greatly on the configuration details and the compressibility and/or flexibility of the materials used.

Other examples of coupling means which can be installed via fold-down methods are known for example from WO 2012/101171, EP 3 031 998 and EP 2 615 221 B1.

The present invention primarily concerns the provision of an alternative floor panel, wherein according to various preferred embodiments, a solution is offered to one or more problems associated with the floor panels from the prior art. In particular, according to various independent aspects, the invention provides a number of combinations of features with which significant improvements may be achieved in floor panels with integral coupling parts, and in particular with integral vertically active locking parts, by use of specific structural properties and/or material characteristics and/or design of the coupling parts.

For this, in its first independent aspect, the invention concerns a floor panel for forming a floor covering, wherein the floor panel has a first pair of mutually opposing edges and a second pair of mutually opposing edges; wherein the first pair of mutually opposing edges comprises coupling parts which allow two of such floor panels to be coupled together, and wherein these coupling parts have the following features:

the coupling parts comprise a horizontally active interlock system which, in a coupled state of two of such floor panels, realizes a lock in the plane of the floor panels perpendicularly to the edges concerned;

the coupling parts also comprise a vertically active interlock system which, in a coupled state of two of such floor panels, realizes a lock transversely to the plane of the floor panels;

the coupling parts are preferably made mainly from the material of the floor panel itself; and the coupling parts are preferably configured such that two of such panels can be coupled together at these edges by means of a rotational movement;

wherein the second pair of mutually opposing edges also comprises coupling parts on both edges, which allow two of such floor panels to be coupled together and wherein these coupling parts have the following features:

the coupling parts comprise a horizontally active interlock system which, in a coupled state of two of such floor panels, realizes a lock in the plane of the floor panels perpendicularly to the edges concerned;

the coupling parts also comprise a vertically active interlock system which, in a coupled state of two of such floor panels, realizes a lock transversely to the plane of the floor panels;

the coupling parts are preferably made mainly from the material of the floor panel itself; and the horizontally active interlock system of the second pair of edges is at least formed by an upwardly pointing bottom hook-shaped part which is situated on one of said two edges, and a downwardly pointing top hook-shaped part which is situated on the opposite edge, wherein the bottom hook-shaped part consists of a lip with an upwardly pointing locking element which proximally thereto defines a female part in the form of a recess, while the top hook-shaped part consists of a lip with a downwardly pointed locking element which forms a male part;

the coupling parts are configured such that two of such floor panels can be coupled together at their respective edges by means of a downward movement of the one floor panel relative to the other;

the vertically active interlock system comprises vertically active locking parts which, by means of respective contact faces define at least a first locking zone and a second locking zone, wherein said first locking zone comprises a first locking part formed on a distal surface of the male coupling part, and cooperating therewith a second locking part of the female part, and said second locking zone comprises a third locking part on a distal surface of said lip of the bottom hook-shaped part, and cooperating therewith a fourth locking part of the floor panel coupled thereto;

with the feature that the following combination of features is present on the second pair of edges: the horizontally active interlock system of the second pair of edges comprises contact faces formed between the upwardly pointing locking element and the downwardly pointing locking element, wherein these contact faces extend from bottom to top in a direction away from said first locking zone;

the male part, during said downward movement (M), may be brought without deformation into the female part to a position in which the downwardly pointing locking element makes contact with the upwardly pointing locking element, wherein this contact on the upwardly pointing locking element is located above said contact faces which are formed in the coupled state. In other words, this initial contact is created in the finally coupled state, and at the location of this original contact on the upwardly pointing locking element, a space is present between the upwardly pointing locking element and the downwardly pointing locking element.

The surface of the upwardly pointing locking element at which the initial contact is formed may serve as a guide surface and can be given any form for supporting the coupling of the male and female parts. Preferably, the part of the surface of the upwardly pointing locking element on which the initial contact is formed extends in a direction which deviates from the direction of extension of said contact faces, available in the finally coupled state. Preferably, both the contact faces and the surface present above these of the upwardly pointing locking element on which the initial contact is formed, extend in directions away from said first locking zone, wherein the contact faces form an angle with the vertical which is smaller than the angle which the upper surface encloses with the vertical. Preferably, the contact faces enclose an angle of 1° to 10° with the vertical.

With the same object as in the first aspect, according to a second independent aspect, the present invention concerns a floor panel for forming a floor covering, wherein the floor panel has a first pair of mutually opposing edges and a second pair of mutually opposing edges; wherein the first pair of mutually opposing edges comprises coupling parts which allow two of such floor panels to be coupled together, and wherein these coupling parts have the following features:
- the coupling parts comprise a horizontally active interlock system which, in a coupled state of two of such floor panels, realizes a lock in the plane of the floor panels perpendicularly to the edges concerned;
- the coupling parts also comprise a vertically active interlock system which, in a coupled state of two of such floor panels, realizes a lock transversely to the plane of the floor panels;
- the coupling parts are preferably made mainly from the material of the floor panel itself; and
- the coupling parts are preferably configured such that two of such panels can be coupled together at these edges by means of a rotational movement;

wherein the second pair of mutually opposing edges also comprises coupling parts on both edges, which allow two of such floor panels to be coupled together and wherein these coupling parts have the following features:
- the coupling parts comprise a horizontally active interlock system which, in a coupled state of two of such floor panels, realizes a lock in the plane of the floor panels perpendicularly to the edges concerned;
- the coupling parts also comprise a vertically active interlock system which, in a coupled state of two of such floor panels, realizes a lock transversely to the plane of the floor panels;
- the coupling parts are preferably made mainly from the material of the floor panel itself; and
- the horizontally active interlock system of the second pair of edges is at least formed by an upwardly pointing bottom hook-shaped part which is situated on one of said two edges, and a downwardly pointing top hook-shaped part which is situated on the opposite edge, wherein the bottom hook-shaped part consists of a lip with an upwardly pointing locking element which proximally thereto defines a female part in the form of a recess, while the top hook-shaped part consists of a lip with a downwardly pointed locking element which forms a male part;
- the coupling parts are configured such that two of such floor panels can be coupled together at their respective edges by means of a downward movement of the one floor panel relative to the other;
- the vertically active interlock system comprises vertically active locking parts which, by means of respective contact faces define at least a first locking zone and a second locking zone, wherein said first locking zone comprises a first locking part formed on a distal surface of the male coupling part, and cooperating therewith a second locking part of the female part, and said second locking zone comprises a third locking part on a distal surface of said lip of the bottom hook-shaped part, and cooperating therewith a fourth locking part of the floor panel coupled thereto;

with the feature that furthermore the following combination of features is present on the second pair of edges:
- the horizontally active interlock system of the second pair of edges comprises contact faces formed between the upwardly pointing locking element and the downwardly pointing locking element, wherein these contact faces extend from bottom to top in a direction away from said first locking zone;
- the vertically active interlock system furthermore comprises contact faces between the downwardly pointing locking element and the lip of the bottom hook-shaped part, wherein these contact faces are at least situated on the half of said female coupling part which is located closest to the upwardly pointing locking element. The contact faces concerned form a support surface for the male part. The interaction between the upwardly pointing locking element and the adjacent support surface ensures a good coupling with a limited risk of splitting or height differences after coupling.

Preferably, said contact faces of the vertically active interlock system are situated on a part of the female coupling part which is situated at a distance from the upper edge of the panel edge with the female coupling part. Preferably, this distance amounts to at least 20 percent of the thickness of the floor panel and/or at least half of the distance between the upper edge and the contact faces of the horizontally active interlock system, more particularly at least half of the distance between the upper edge and the lowest point of the contact faces of the horizontally active interlock system.

Preferably, said contact faces of the vertically active interlock system adjoin or practically adjoin the contact faces of the horizontally active interlock system. In some cases, a gap may be enclosed between the two pairs of contact faces, for example because they are joined to each other by means of a chamfer or rounding.

It is clear that the floor panel of the second aspect may have the properties of the first aspect and/or preferential embodiments thereof.

With the same object as in the first aspect, according to a third independent aspect, the present invention concerns a floor panel for forming a floor covering, wherein the floor panel has a first pair of mutually opposing edges and a second pair of mutually opposing edges; wherein the first pair of mutually opposing edges comprises coupling parts which allow two of such floor panels to be coupled together, and wherein these coupling parts have the following features:
- the coupling parts comprise a horizontally active interlock system which, in a coupled state of two of such floor panels, realizes a lock in the plane of the floor panels perpendicularly to the edges concerned;

the coupling parts also comprise a vertically active interlock system which, in a coupled state of two of such floor panels, realizes a lock transversely to the plane of the floor panels;

the coupling parts are preferably made mainly from the material of the floor panel itself; and the coupling parts are preferably configured such that two of such panels can be coupled together at these edges by means of a rotational movement;

wherein the second pair of mutually opposing edges also comprises coupling parts on both edges, which allow two of such floor panels to be coupled together and wherein these coupling parts have the following features:

the coupling parts comprise a horizontally active interlock system which, in a coupled state of two of such floor panels, realizes a lock in the plane of the floor panels perpendicularly to the edges concerned;

the coupling parts also comprise a vertically active interlock system which, in a coupled state of two of such floor panels, realizes a lock transversely to the plane of the floor panels;

the coupling parts are preferably made mainly from the material of the floor panel itself; and the horizontally active interlock system of the second pair of edges is at least formed by an upwardly pointing bottom hook-shaped part which is situated on one of said two edges, and a downwardly pointing top hook-shaped part which is situated on the opposite edge, wherein the bottom hook-shaped part consists of a lip with an upwardly pointing locking element which proximally thereto defines a female part in the form of a recess, while the top hook-shaped part consists of a lip with a downwardly pointed locking element which forms a male part;

the coupling parts are configured such that two of such floor panels can be coupled together at their respective edges by means of a downward movement of the one floor panel relative to the other;

the vertically active interlock system comprises vertically active locking parts which, by means of respective contact faces define at least a first locking zone and a second locking zone, wherein said first locking zone comprises a first locking part formed on a distal surface of the male coupling part, and cooperating therewith a second locking part of the female part, and said second locking zone comprises a third locking part on a distal surface of said lip of the bottom hook-shaped part, and cooperating therewith a fourth locking part of the floor panel coupled thereto;

with the feature that the following combination of features is present on the second pair of edges: the horizontally active interlock system of the second pair of edges comprises contact faces formed between the upwardly pointing locking element and the downwardly pointing locking element, wherein these contact faces extend from bottom to top in a direction away from said first locking zone;

the upwardly pointing locking part on its underside has a recess, wherein the theoretical line between the proximal point of said recess and the lowest point of the contact faces forms an angle with the vertical of 0° to 35°, wherein preferably the proximal point of the recess is distal from the lowest point of the contact faces, or in other words said theoretical line runs from said proximal point of the recess inwardly to the lowest point of the contact faces.

The configuration of the recess presented in the third aspect gives a combination of a good connection strength with greater ease of installation.

It is clear that the floor panel of the third aspect may have the features of the first and/or second independent aspects, and/or preferential embodiments thereof.

With the same object as in the first aspect, according to a fourth independent aspect, the present invention concerns a floor panel for forming a floor covering, wherein the floor panel has a first pair of mutually opposing edges and a second pair of mutually opposing edges; wherein the first pair of mutually opposing edges comprises coupling parts which allow two of such floor panels to be coupled together, and wherein these coupling parts have the following features:

the coupling parts comprise a horizontally active interlock system which, in a coupled state of two of such floor panels, realizes a lock in the plane of the floor panels perpendicularly to the edges concerned;

the coupling parts also comprise a vertically active interlock system which, in a coupled state of two of such floor panels, realizes a lock transversely to the plane of the floor panels;

the coupling parts are preferably made mainly from the material of the floor panel itself; and the coupling parts are preferably configured such that two of such panels can be coupled together at these edges by means of a rotational movement;

wherein the second pair of mutually opposing edges also comprises coupling parts on both edges, which allow two of such floor panels to be coupled together and wherein these coupling parts have the following features:

the coupling parts comprise a horizontally active interlock system which, in a coupled state of two of such floor panels, realizes a lock in the plane of the floor panels perpendicularly to the edges concerned;

the coupling parts also comprise a vertically active interlock system which, in a coupled state of two of such floor panels, realizes a lock transversely to the plane of the floor panels;

the coupling parts are preferably made mainly from the material of the floor panel itself; and the horizontally active interlock system of the second pair of edges is at least formed by an upwardly pointing bottom hook-shaped part which is situated on one of said two edges, and a downwardly pointing top hook-shaped part which is situated on the opposite edge, wherein the bottom hook-shaped part consists of a lip with an upwardly pointing locking element which proximally thereto defines a female part in the form of a recess, while the top hook-shaped part consists of a lip with a downwardly pointed locking element which forms a male part;

the coupling parts are configured such that two of such floor panels can be coupled together at their respective edges by means of a downward movement of the one floor panel relative to the other;

the vertically active interlock system comprises vertically active locking parts which, by means of respective contact faces define at least a first locking zone and a second locking zone, wherein said first locking zone comprises a first locking part formed on a distal surface of the male coupling part, and cooperating therewith a second locking part of the female part, and said second locking zone comprises a third locking part on a distal surface of said lip of the bottom hook-shaped part, and cooperating therewith a fourth locking part of the floor panel coupled thereto;

with the feature that the following combination of features is present on the second pair of edges: the horizontally active interlock system of the second pair of edges comprises contact faces formed between the upwardly pointing locking element and the downwardly pointing locking element, wherein these contact faces extend from bottom to top in a direction away from said first locking zone, wherein the contact faces enclose an angle with the vertical from 1° to 10°.

Such steep contact faces of the horizontally active interlock system give a good connection strength.

It is clear that the floor panel of the fourth aspect may also have the features of the first and/or second and/or third aspects, and/or preferential embodiments thereof.

In general, the floor panel of any of said aspects may furthermore have one or more of the following properties, or any mutual combination of these properties, insofar as such a combination does not contain conflicting properties:

the coupling parts are configured on the floor panel such that the floor panels can be installed following the fold-down principle;

the floor panel is oblong rectangular, and the first pair of mutually opposing edges forms the long sides of the floor panel while the second pair of mutually opposing edges forms the short sides of the floor panel;

the coupling parts on the second pair of edges may be joined together via a downward snap movement;

the coupling parts of the first and/or second pair of edges are largely configured as profiles in the material of the floor panel, preferably largely or completely by means of material-removal machining, preferably by means of one or more milling operations, for example with milling cutters which are active at different working angles;

the coupling parts on the first and/or second pair of edges are configured as millable profiles which can be milled with milling cutters with a rotational axis which is located outside the floor panels during milling;

said male part may or may not be split;

only one male part, which may or may not be split, is applied to the second pair of edges; the contact faces of the second and/or fourth locking part, preferably of both, is/are configured so as to be flat;

the contact faces of the second and/or fourth locking part, preferably of both, is/are formed curved; here, the contact face of the fourth locking part is preferably convex while the contact face of the second locking part is flat or curved, preferably concave;

the bottom hook-shaped part, and more particularly the lip thereof, can be elastically bent and/or elastically deformed;

a recess is present at the bottom of the lip, preferably configured such that the upwardly pointing locking element can be tilted elastically;

a space is present below the male part;

in coupled state, a space is present behind the distal end of the bottom hook-shaped part;

in coupled state, a space is present above the upwardly pointing locking element, which space is preferably formed continuously with the space mentioned in the preceding paragraph;

the centre point of the first locking zone is situated higher than the centre point of the second locking zone;

the coupling parts on the first pair of edges and/or on the second pair of edges are completely integrally made of the material of the floor panel, more particularly from a substrate which forms part of the floor panel;

the distal end of the top hook-shaped part above said first locking zone is completely free from downwardly active support points, or at least free from support points which, in coupled state, define tangents which make an angle with a horizontal of less than 45°;

the coupling parts on the first pair and/or second pair of edges are configured such that in coupled state, a so-called pretension exists which presses the floor panels concerned towards each other at the respective edges, wherein this takes place preferably by use of overlapping contours, and wherein the pretension is the result of a deformation, either an elastic bending or an elastic compression or a combination of both;

the coupling parts on the second pair of edges are free from hook & loop closures and/or glue connections;

on the first and/or second pair of edges, the floor panel is provided with chamfers;

the floor panel has a top layer and/or decor layer which extends integrally from the horizontal top surface of the floor panel up to the chamfers;

the chamfers are formed by impressions;

the floor panel has a top layer with a decor;

the floor panels have a substrate which may or may not be multipiece, and which may or may not consist of several substrate layers, wherein the substrate or, in the case of several layers, at least one of the substrate layers consists of a material which fulfils one or more or any combination of the following features, insofar as such a combination does not contain any conflicting features:

plastic-based material, foamed or not foamed, resilient or hard, with or without plasticizer, filled or not filled with a wood-based or bamboo-based material for example in the form of fibres, chips, dust or sawdust, and/or filled with other substances e.g. chalk, lime, talc, ground stone-based fillers;

plastic-based material which is foamed with fine pores so that the majority of the plastic-based material contains pores and/or gas inclusions with dimensions of less than 1 mm, preferably less than 0.1 mm and even more preferably less than 0.01 mm;

plastic-based material which is obtained by extruding plastic-based raw material in the form of sheet material, wherein in a preferred embodiment this material is foamed, this in turn preferably has fine pores which are such that the majority of the plastic-based material contains pores and/or gas inclusions with dimensions of less than 1 mm, preferably less than 0.1 mm and even more preferably less than 0.01 mm;

plastic-based material which is obtained by spreading plastic-based raw material, which may or may not be combined with other materials, by means of a spreading process and consolidating this into the form of sheet material under the influence of pressure and in some cases increased temperature, wherein in a preferred embodiment the resulting material is foamed, this in turn preferably has fine pores which are such that the majority of the plastic-based material contains pores and/or gas inclusions with dimensions of less than 1 mm, preferably less than 0.1 mm and even more preferably less than 0.01 mm;

plastic consisting of or based on or containing one of the following materials: polypropylene (PP), polyethylene (PE), polyethylene terephthalate (PET), polyurethane (PUR), polyvinyl chloride (PVC), polyisocyanurate (PIR) or other suitable plastics;

plastic-based material with plasticizers, wherein the plastic-based material is preferably selected from the material stated in the preceding paragraph;

wood-based material, for example MDF, HDF, prefabricated wood panels, more particularly so-called engineered wood panels, where applicable with adapted core or end strips;

the floor panel is configured as one of the following types:
a laminate floor panel;
a so-called resilient floor panel;
an LVT panel or CVT panel or comparable panel based on a plastic other than vinyl;
a floor panel with a first plastic-based, preferably foamed substrate layer, and thereon a preferably thinner second substrate layer made of or based on vinyl or another plastic;
a floor panel with a hard plastic-based substrate.

Preferably, the coupling parts of the first pair of edges, as stated, allow coupling by means of a rotational movement. According to an alternative embodiment, they are at least configured such that they can be coupled together by means of a downward movement. In such a case, coupling parts may also be used on the first pair of edges and have the features as described above for the second pair of edges.

According to a different variant of any of the above-mentioned aspects, in the first locking zone there is no vertical lock, and merely a horizontal lock is present

BRIEF DESCRIPTION OF THE DRAWINGS

With the aim of presenting the features of the invention better, some preferential embodiments are described below as examples without limitative character, with reference to the appended drawings in which.

DETAILED DESCRIPTION OF VARIOUS EMBODIMENTS

Figure 1:
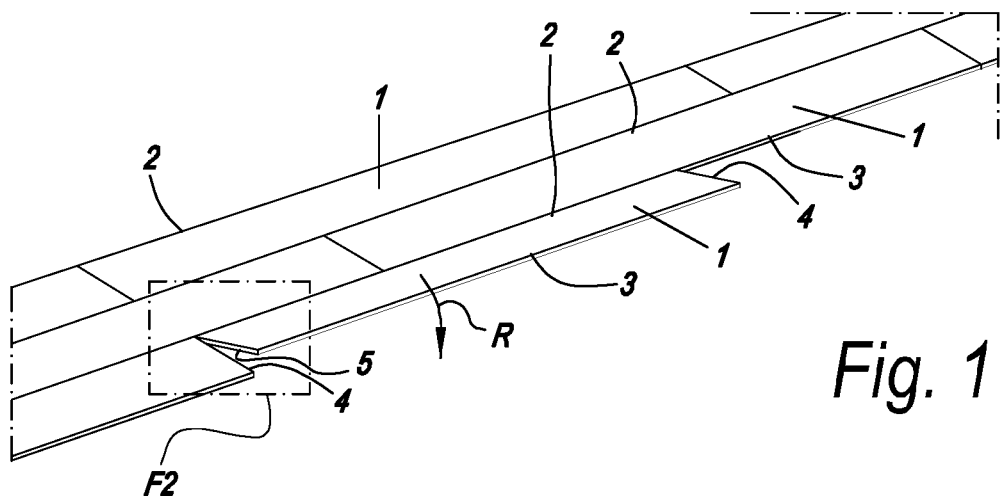
FIG. 1 shows diagrammatically and in perspective a part of a floor covering which consists of floor panels according to the invention.
Figure 2:
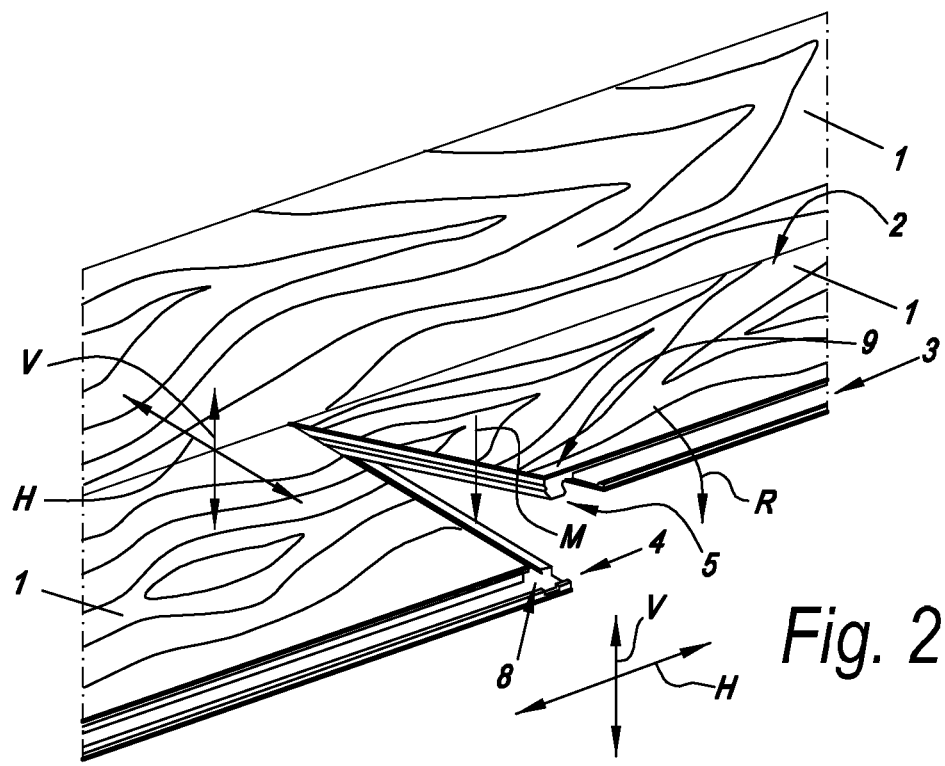
FIG. 2 shows on a larger scale the part indicated by F2 in FIG. 1.
Figure 3:
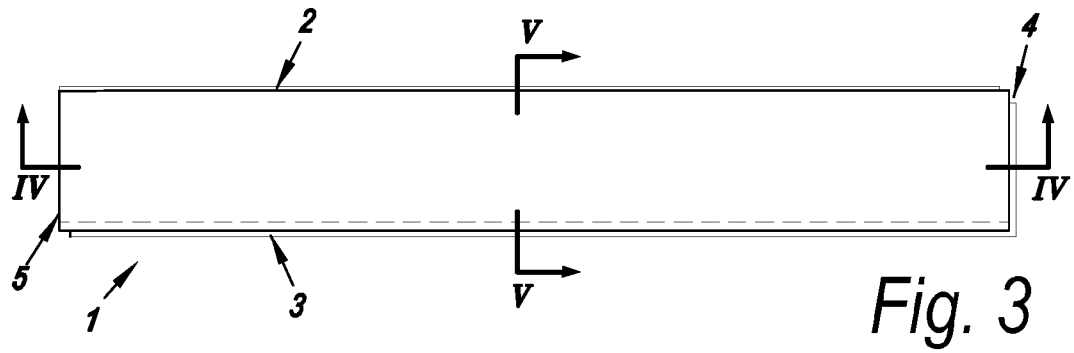
FIG. 3 shows in top view a floor panel from the floor covering of FIGS. 1 and 2.

As shown in FIGS. 1 and 2, the invention concerns floor panels 1 for forming a floor covering, which floor panels 1 have a first pair of mutually opposing edges 2-3 and a second pair of mutually opposing edges 4-5.

The floor panels 1 shown are configured at their edges such that they can be coupled together following the so-called fold-down principle, which is a principle known in itself, for example from WO 01/75247, and in which such floor panels 1 can be coupled to each other at the first pair of edges 2-3 by a rotational movement R and at the second pair of edges 4-5 by a downward movement M, wherein the downward movement M is the result of the rotational movement R and hence occurs largely simultaneously. The floor panels 1 are here configured at their edges 2-3 and 4-5 such that finally, an interlock occurs in the vertical direction V and in the horizontal direction H, the latter being perpendicular to the edges concerned.

Figure 4:
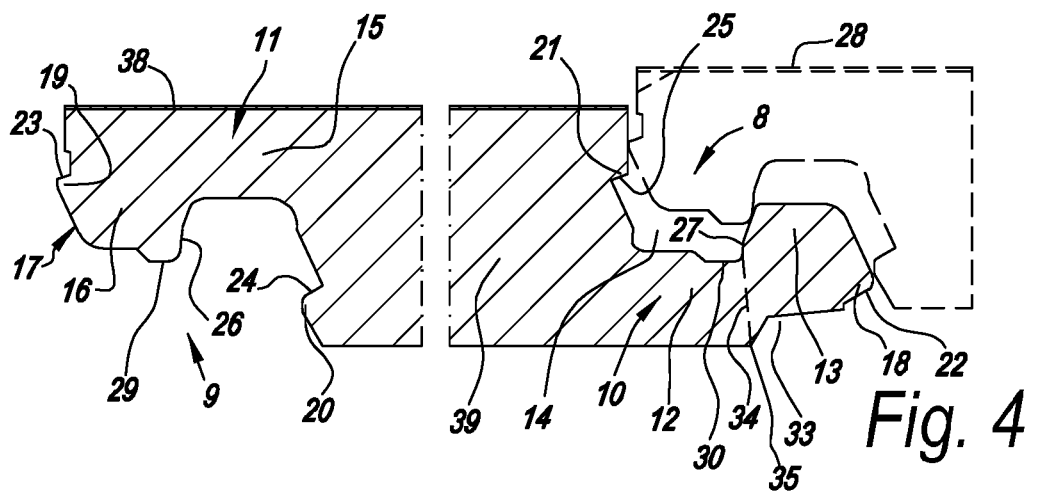
FIGS. 4 and 5 show on larger scale cross-sections along lines IV-IV and V-V respectively in FIG. 3.
Figure 5:
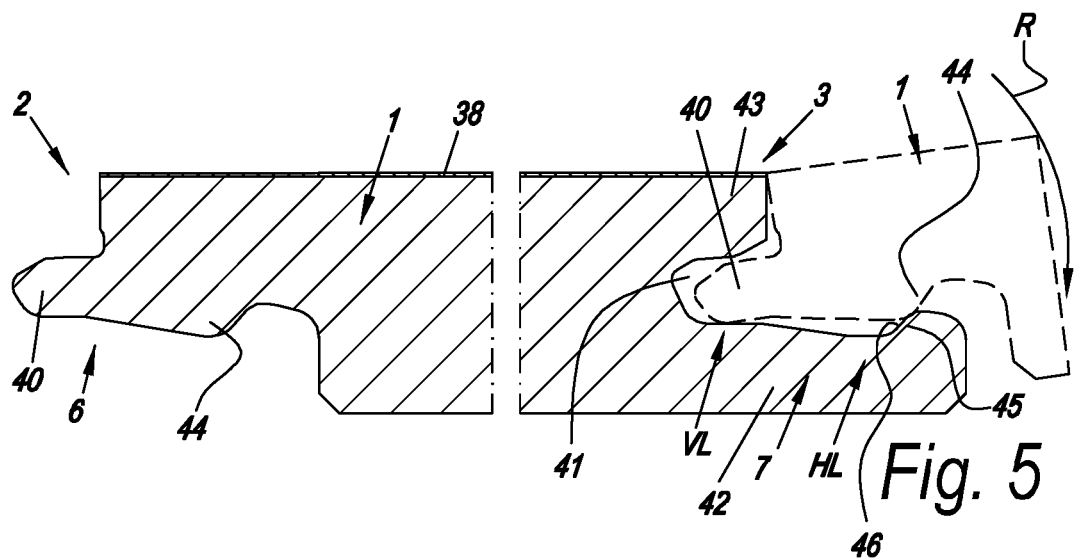
Figure 6:
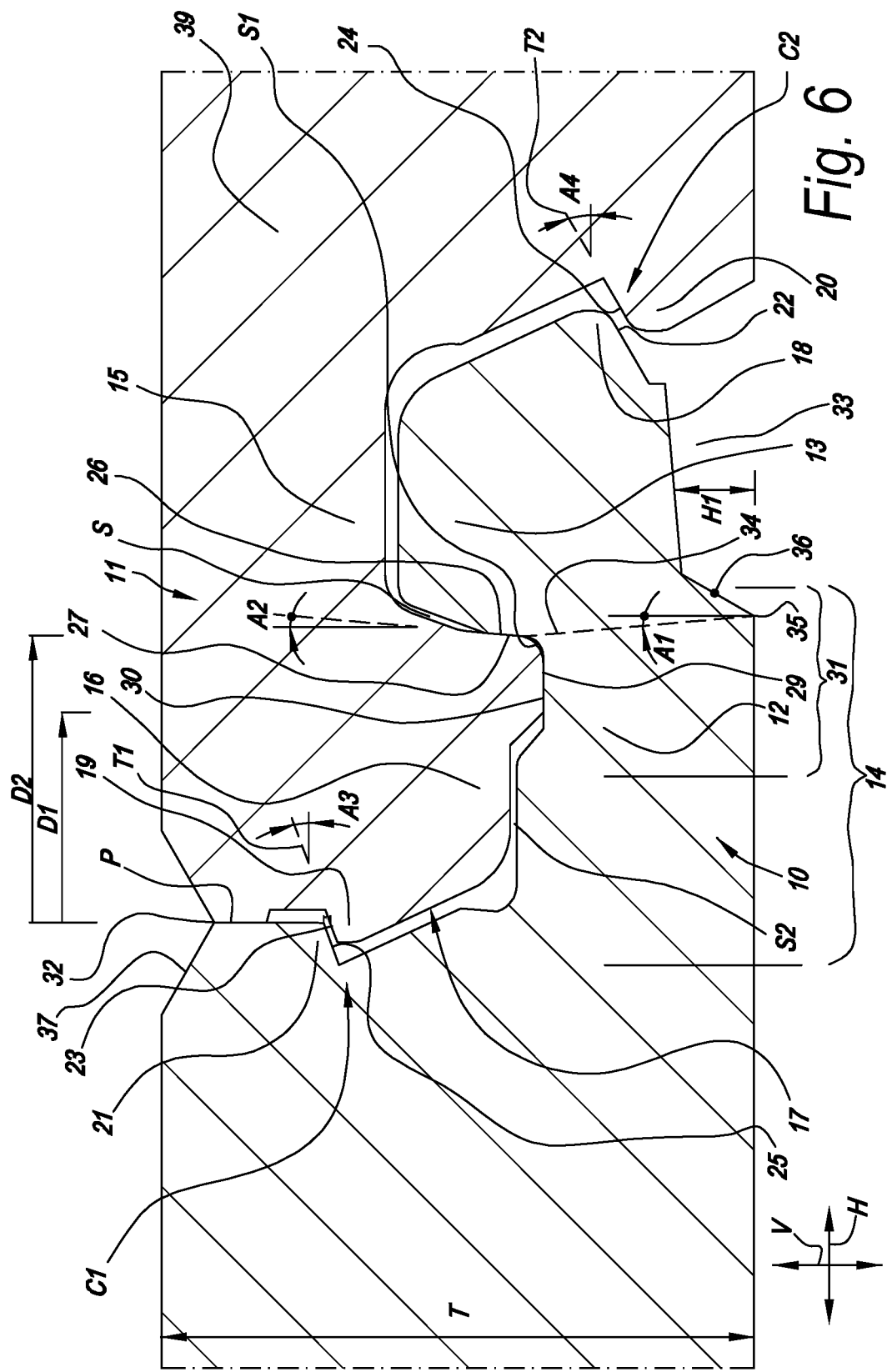
FIG. 6 shows the coupling parts visible in FIG. 4 on a larger scale and in coupled state.

As shown in FIGS. 3 to 6, for this such a floor panel 1 is provided at its first pair of edges 2-3 with coupling parts 6-7, while at the second pair of edges coupling parts 8-9 are provided, which coupling parts are described in more detail below with reference to FIGS. 4 to 6.

The coupling parts 6-7 of the first pair of edges 2-3, as evident in FIG. 5, have at least the following basic features:
the coupling parts 6-7 comprise a horizontally active interlock system HL which, in a coupled state of two of such floor panels 1, realizes a lock in the plane of the floor panels 1 perpendicularly to the edges concerned 2-3;
the coupling parts 6-7 also comprise a vertically active interlock system VL which, in a coupled state of two of such floor panels 1, realizes a lock transversely to the plane of the floor panels, in other words in the vertical direction;
the coupling parts 6-7 are preferably made mainly from the material of the floor panel 1 itself; and
the coupling parts 6-7 are preferably configured such that two of such floor panels 1 can be coupled together at these edges by means of a rotational movement R.

The coupling parts 8-9 of the first pair of edges 4-5, as evident in FIGS. 4 and 6, have at least the following basic features:
the coupling parts 8-9 comprise a horizontally active interlock system which, in a coupled state of two of such floor panels 1, realizes a lock in the plane of the floor panels 1 perpendicularly to the edges concerned 4-5;
the coupling parts 8-9 also comprise a vertically active interlock system which, in a coupled state of two of such floor panels 1, realizes a lock transversely to the plane of the floor panels 1;
the coupling parts 8-9 are preferably made mainly from the material of the floor panel 1 itself; the horizontally active interlock system of the second pair of edges 4-5 is at least formed by an upwardly pointing bottom hook-shaped part 10 which is situated on one of said two edges, in this case the edge 4, and a downwardly pointing top hook-shaped part 11 which is situated on the opposite edge 5, wherein the bottom hook-shaped part 10 consists of a lip 12 with an upwardly pointing locking element 13 which proximally thereto defines a female part 14 in the form of a recess, while the top hook-shaped part 11 consists of a lip 15 with a downwardly pointed locking element 16 which forms a male part 17;
the coupling parts 8-9 are configured such that two of such floor panels 1 can be coupled together at their respective edges 4-5 by means of a downward movement M of the one floor panel relative to the other;
the vertically active interlock system comprises vertically active locking parts 18-19-20-21 which, by means of respective contact faces 22-23-24-25, define at least a first locking zone C1 and a second locking zone C2, wherein said first locking zone C1 comprises a first locking part 19 formed on a distal surface of the male coupling part 17, and cooperating therewith a second locking part 21 of the female part 14, and said second locking zone C2 comprises a third locking part 18 on a distal surface of said lip 12 of the bottom hook-shaped part 10, and cooperating therewith a fourth locking part 20 of the floor panel 1 coupled thereto.

The second pair edges 4-5 furthermore has the following combination of features:

the horizontally active interlock system of the second pair of edges 4-5 comprises contact faces 26-27 formed between the upwardly pointing locking element 13 and the downwardly pointing locking element 16, wherein these contact faces 26-27 extend from bottom to top in a direction away from said first locking zone C1;

as shown by the dotted line 28 on FIG. 4, the male part 17, during said downward movement M, may be brought without deformation into the female part 14 into a position in which the downwardly pointing locking element 16 makes contact with the upwardly pointing locking element 13, wherein this contact on the upwardly pointing locking element 13 is located above said contact faces 26-27 which are formed in the coupled state.

Said initial contact is created in the finally coupled state, as shown on FIG. 6, and at the location of this original contact on the upwardly pointing locking element 13, a space S is present between the upwardly pointing locking element 13 and the downwardly pointing locking element 16.

The embodiment of the edges 4 and 5 shown in FIGS. 4 and 6 again has the specific features of the second aspect of the invention described in the introduction, namely that:

the horizontally active interlock system of the second pair of edges 4-5 comprises contact faces 26-27 formed between the upwardly pointing locking element 13 and the downwardly pointing locking element 16, wherein these contact faces 26-27 extend from bottom to top in a direction away from said first locking zone C1;

the vertically active interlock system furthermore comprises contact faces 29-30 between the downwardly pointing locking element 16 and the lip 12 of the bottom hook-shaped part 10, wherein these contact faces 29-30 are at least situated on the half 31 of said lip 10 which is located closest to the upwardly pointing locking element 13.

Preferably, said contact faces 29-30 of the vertically active interlock system are, as shown here, situated on a part of the female coupling part 14 which is situated at a distance D1 from the upper edge 32 of the panel edge with the female coupling part 14. Preferably, this distance is at least 20 percent of the thickness T of the floor panel 1 and/or at least half of the distance D2 between the upper edge 32 and the contact faces 26-27 of the horizontally active interlock system.

Preferably, said contact faces 29-30 of the vertically active interlock system adjoin or practically adjoin the contact faces 26-27 of the horizontally active interlock system. In some cases, as here, a space S1 may be enclosed between the two pairs of contact faces 26-27; 28-29.

The embodiment of the edges 4-5 shown in FIGS. 4 and 6 again has the specific features of the third aspect of the invention described in the introduction, namely that:

the horizontally active interlock system of the second pair of edges 4-5 comprises contact faces 26-27 formed between the upwardly pointing locking element 13 and the downwardly pointing locking element 16, wherein these contact faces 26-27 extend from bottom to top in a direction away from said first locking zone C1;

the upwardly pointed locking part 13 has a recess 33 on its underside, wherein the theoretical line 34 between the proximally located point 35 of said recess 33 and the lowest point of the contact faces 26-27 forms an angle A1 with the vertical from 0° to 35°.

In the example given here, the proximal point 35 of the recess 33 is distal from the lowest point of the contact faces 26-27, or in other words said theoretical line 34 runs from said proximal point 35 of the recess 33 inward to the lowest point of the contact faces 26-27.

It is pointed out that instead of the theoretical line 34, a theoretical line may be considered between the lowest point of the contact faces 26-27 and the point 36 where the height H1 of the recess 33 in the proximal direction is less than 0.25 mm. Such a restricted height of the recess 33 indeed only has a limited or no effect on the flexibility of the upwardly pointing locking element 13. Such a theoretical line 34 then preferably fulfils the same features, namely that it forms an angle with the vertical of between 0° and 35°.

The embodiment of the edges 4-5 shown in FIGS. 4 and 6 furthermore has the specific features of the fourth aspect of the invention described in the introduction, namely that:

the horizontally active interlock system of the second pair of edges 4-5 comprises contact faces 26-27 formed between the upwardly pointing locking element 13 and the downwardly pointing locking element 16, wherein these contact faces 13 extend from bottom to top in a direction away from said first locking zone C1, wherein the contact faces 26-27 enclose an angle A2 with the vertical from 1° to 10°.

It is noted that the coupling parts on the edges 2-3 and/or 4-5 are preferably configured such that in the coupled state, a so-called pretension is created which presses the coupled floor panels 1 towards each other, preferably with their upper edges towards and against each other. It is clear that the feature of the so-called pretension may be applied in all embodiments of floor panels according to the invention as described above or below. Such a pretension may be implemented in various ways, and preferably results from a stress force which in coupled state is generated by elastic bending and/or compression, wherein the return force thus generated ensures that the floor panels are pressed towards each other. Such a bending may be obtained by the coupling parts 8 and 9 in reality having slightly overlapping contours, or in other words profiled cross-sections.

As shown, it is preferred that the contact faces 26-27 and/or 29-30 are largely flat.

According to another advantageous feature, the tangent T1 determined by said first locking zone C1 forms an angle A3 with the horizontal which is less than 60°, preferably less than 45°, and preferably less than 25°. Such a small angle provides a better engagement.

Such values for the angle A3 may also be used in combination with the other aspects of the invention insofar as not conflicting.

According to a preferred feature, the tangent T2 determined by said second locking zone C2 forms an angle A4 with the horizontal which is less than 60°, preferably less than 45° or, as shown in the examples, less than 35°.

Preferably, the angle A4 is greater than the angle A3, and preferably at least 5° or at least 10° greater.

It is clear that the locking element 13 or at least the respective contact face 27 thereof may be tiltable or otherwise flexible. This tiltability may be implemented in any suitable fashion. Preferably, for this the recess 33 is provided on the underside of the floor panel 1, but other techniques are not excluded. The tiltability may for example also be obtained due to elasticity in the material.

It is further pointed out that the floor panel from FIGS. 1 to 6 has the following properties:

the coupling parts 6-7 and 8-9 are configured on the floor panel 1 such that the several of such floor panels 1 can be installed following the fold-down principle;

the floor panel 1 is oblong rectangular, and the first pair of mutually opposing edges 2-3 forms the long sides of the floor panel 1 while the second pair of mutually opposing edges 4-5 forms the short sides of the floor panel 1;

the coupling parts 8-9 on the second pair of edges 4-5 may be joined together via a downward snap movement M;

the coupling parts on the first and/or second pair of edges are largely configured as profiles in the material of the floor panel, preferably largely or completely by means of material-removal machining, preferably by means of one or more milling operations, for example with milling cutters which are active at different working angles, and even more particularly milling cutters for which during use the rotational axis is located outside the floor panel;

the coupling parts on the first and/or second pair of edges are configured as millable profiles which can be milled with milling cutters with a rotational axis which is located outside the floor panels during milling;

said male part 17 may or may not be split; preferably, as shown here, the male part is solid. According to an alternative, the male part is not however solid and contains one or more cavities or recesses, wherein it may for example be split, wherein the presence of such cavities or recesses offers the advantage that the locking parts are able to be more elastically movable; either the one or the other possibility may be selected depending on the material used and/or as a function of the desired locking effect;

only one male part, which may or may not be split, is applied to the second pair of edges; the bottom hook-shaped part 10, and more particularly the lip 12 thereof, can be elastically bent and/or elastically deformed;

a space S2 is present below the male part, adjacent to the vertically active contact faces 29-30;

the two contact faces of the first locking zone C1, including any extensions thereof, viewed in cross-section, extend to both the left and the right of the respective closure plane P, wherein the closure plane P is defined as a vertical plane through the upper edges 32 of the coupled floor panels 1 or the place where the floor panels 1 come together at the top;

the centre point of the first locking zone C1 situated higher than the centre point of the second locking zone C2 the coupling parts on the first pair of edges and/or on the second pair of edges are completely integrally made of the material of the floor panel 1, more particularly from a substrate which forms part of the floor panel;

the distal end of the top hook-shaped part above said first locking zone C1 is completely free from downwardly active support points, or at least free from support points which, in coupled state, define tangents which make an angle with a horizontal of less than 45°;

the coupling parts on the second pair of edges are free from hook & loop closures and/or glue connections;

on the first and/or second pair of edges, the floor panel is provided with chamfers 37, such as bevelled edges;

the floor panel has a decorative top layer 38 which extends integrally from the horizontal top surface of the floor panel up to the chamfers 37;

the floor panels have a substrate 39 which may or may not be multipiece, and which may or may not consist of several substrate layers, wherein the substrate or, in the case of several layers, at least one of the substrate layers consists of a material which fulfils one or more or any combination of the following features, insofar as such a combination does not contain any conflicting features: plastic-based material, foamed or not foamed, resilient or hard, with or without plasticizer, filled or not filled with a wood-based or bamboo-based material for example in the form of fibres, chips, dust or sawdust, and/or filled with other substances e.g. chalk, lime, talc, ground stone-based fillers;

plastic-based material which is foamed with fine pores so that the majority of the plastic-based material contains pores and/or gas inclusions with dimensions of less than 1 mm, preferably less than 0.1 mm and even more preferably less than 0.01 mm, which means that the majority of the volume of the material concerned has no larger pores, and/or that on average the pores comply with said dimensions;

plastic-based material which is obtained by extruding plastic-based raw material in the form of sheet material, wherein in a preferred embodiment this material is foamed, this in turn preferably has fine pores which are such that the majority of the plastic-based material, as stated, contains pores and/or gas inclusions with dimensions of less than 1 mm, preferably less than 0.1 mm and even more preferably less than 0.01 mm;

plastic-based material which is obtained by spreading plastic-based raw material, which may or may not be combined with other materials, by means of a spreading process and consolidating this into the form of sheet material under the influence of pressure and in some cases increased temperature, wherein in a preferred embodiment the resulting material is foamed, this in turn preferably has fine pores which are such that the majority of the plastic-based material, as stated, contains pores and/or gas inclusions with dimensions of less than 1 mm, preferably less than 0.1 mm and even more preferably less than 0.01 mm;

plastic consisting of or based on or containing one of the following materials: PP, PE, PET, PUR, PVC, PIR or other suitable plastics;

plastic-based material with plasticizers, wherein the plastic-based material is preferably selected from the material stated in the preceding paragraph;

wood-based material, for example MDF, HDF, prefabricated wood panels, more particularly so-called engineered wood panels, where applicable with adapted core or end strips, wherein in the latter case preferably the coupling part 6 and/or the coupling part 7 is produced in the adapted core or adapted end strip; the term "adapted" means that with respect to a conventional panel, an adapted material is used for the core or for one or more end strips which is more suitable for creation of the coupling parts 8 and/or 9 therein;

the floor panel is configured as one of the following types:

a laminate floor panel;

a so-called resilient floor panel;

an LVT panel or CVT panel or comparable panel based on a plastic other than vinyl;

a floor panel with a first plastic-based, preferably foamed substrate layer, and thereon a preferably thinner second substrate layer made of or based on vinyl or another plastic;

a floor panel with a hard plastic-based substrate.

It is noted that said vertically active interlock system VL and horizontally active interlock system HL of the first pair of edges 2-3 may be implemented in any fashion. Preferably, as shown here in FIG. 5 for the vertically active interlock system VL, use is made of a tongue 40 and a groove 41, which groove is preferably delimited by a bottom lip 42 and a top lip 43. For the horizontally active interlock system, use is made of the locking parts 44 and 45 arranged on the tongue and groove, which engage in each other in coupled state. Here preferably the bottom lip 42 extends distally past the top lip 43, and the locking part 45 also has a locking surface 46 which is situated past the distal end of the top lip 43.

The term "tangent" according to the invention may be interpreted in a number of different ways. In general, it means a line which is tangential between two co-operating contact faces; the place where this tangent is considered may be arbitrary, but normally it is regarded in a central position, or the global tangent is thus considered unless defined otherwise. Alternatively, according to this application, the term "tangent" may also be replaced by the direction of the cooperating contact faces or the mean or global direction or global tangent thereof.

It is furthermore pointed out that the terms "distal side of the male part" and "proximal side of the female part" normally also include the extensions of the sides up to the top of the floor panel.

The terms "contact faces" and "locking zones" may also mean a linear contact; a contact face or locking zone is essentially the place where the actual contact is created in coupled state and under load where applicable. Where the text mentions "extensions of contact faces", this means the actual continuations of the planes as well as a specific location where the actual contact exists. In this case, this is not an extension which is theoretically not present.

The term "coupling parts which are mainly made of the material of the floor panel" means that at least the essential constituents thereof are formed integrally from the material of the floor panel, and that at least all locking parts and locking elements are made integrally from the material of the floor panel. In other words, this means that there are no separate locking strips such as elastically bendable locking strips (for example as known under the names "Multifit" or "5G" or the like). This does not for example exclude that the coupling parts used according to the invention may be provided with a coating or similar. It also does not exclude that the coupling parts are formed integrally in edge portions which consist of a particular choice of material and are included in the edges of the substrate of the floor panel, as known for example from the production of so-called engineered wood panels.

The references V and H refer to the vertical and horizontal directions.

It is clear that the invention may be used at least with oblong rectangular and square floor panels, both with conventional laying patterns and with specific laying patterns, for example herringbone patterns.

The invention may be used both for relatively thin floor panels for forming a floor covering, for example of 4 mm or thinner, and with thicker floor panels.

The embodiment shown in the figures furthermore has the feature that a play, or in other words a space, is present between the locking parts 19-21 of the first locking zone C1. In the example shown, such a space is also present between the locking parts 18-20 of the second locking zone C2. These spaces are not necessarily present, but it is preferred that they are present in at least one of the first locking zone C1 and second locking zone C2. If present in both locking zones C1-C2, then the space at the location of the second locking zone C2, viewed in the vertical direction, is preferably larger than the space at the location of the first locking zone C1. Preferably, the space at the location of the first locking zone C1, in the vertical direction, is less than 0.2 mm, preferably 0.1 mm or less, such as for example around 0.05 mm. In this way, the possible height differences between the coupled edges are limited. In addition, the presence of the chamfers 37 may to some extent mask such minor height differences. A space if present at the location of the second locking zone C2 may, as stated, be designed larger, for example with a dimension in the vertical direction of more than 0.05 mm, preferably of around 0.1 mm or larger, preferably however less than 0.25 mm.

The spaces between the different locking zones C1-C2 increase the ease of installation and have little or no influence on the quality of the connection. Any larger space at the location of the second locking zone may offer room for a possible residual tilting of the upwardly pointing locking element 13.

It is also pointed out that the second locking zone C2 has an added value for loading of the connection both in the horizontal direction H and in the vertical direction V. In both cases, the locking zone C2 however results in some blocking of the tilt movement of the upwardly pointing locking element 13.

Preferably, as shown, no space is formed between the contact faces 26-27 of the horizontal interlock system. In other words, a lock is achieved in the horizontal direction H which is free from play, and as stated may even have a pretension.

The present invention is in no sense restricted to the examples described above and shown in the figures, but such floor panels may be produced in different variants without leaving the scope of the present invention.

The invention claimed is:

1. A floor panel for forming a floor covering, wherein the floor panel has a first pair of mutually opposing edges and a second pair of mutually opposing edges;
    wherein the first pair of mutually opposing edges comprises coupling parts which allow two of such floor panels to be coupled together, and
    wherein these coupling parts have the following features:
    the coupling parts comprise a horizontally active interlock system which, in a coupled state of two of such floor panels, realizes a lock in the plane of the floor panels perpendicularly to the edges concerned;
    the coupling parts also comprise a vertically active interlock system which, in a coupled state of two of such floor panels, realizes a lock transversely to a plane of the floor panels;
    the coupling parts are configured such that two of such panels can be coupled together at these edges by means of a rotational movement;
    wherein the second pair of mutually opposing edges also comprises coupling parts on both edges, which allow two of such floor panels to be coupled together and wherein these coupling parts have the following features:
    the coupling parts comprise a horizontally active interlock system which, in a coupled state of two of such floor panels, realizes a lock in the plane of the floor panels perpendicularly to the edges concerned;
    the coupling parts also comprise a vertically active interlock system which, in a coupled state of two of such floor panels, realizes a lock transversely to the plane of the floor panels;

the horizontally active interlock system of the second pair of edges is at least formed by an upwardly pointing bottom hook-shaped part which is situated on one of said two edges, and a downwardly pointing top hook-shaped part which is situated on the opposite edge, wherein the bottom hook-shaped part consists of a lip with an upwardly pointing locking element which proximally thereto defines a female part in the form of a recess, while the top hook-shaped part consists of a lip with a downwardly pointed locking element which forms a male part;

the coupling parts are configured such that two of such floor panels can be coupled together at their respective edges by means of a downward movement of the one floor panel relative to the other;

the vertically active interlock system comprises vertically active locking parts which, by means of respective contact faces, define at least a first locking zone and a second locking zone, wherein said first locking zone comprises a first locking part formed on a distal surface of the male coupling part, and cooperating therewith a second locking part of the female part, and said second locking zone comprises a third locking part on a distal surface of said lip of the bottom hook-shaped part, and cooperating therewith a fourth locking part of the floor panel coupled thereto;

wherein the horizontally active interlock system of the second pair of edges comprises contact faces formed between the upwardly pointing locking element and the downwardly pointing locking element, wherein these contact faces extend from bottom to top in a direction away from said first locking zone; and the upwardly pointed locking part has a recess on its underside, wherein a theoretical line between a proximate-most located point of said recess and the lowest point of the contact faces forms an angle with the vertical from 0° to 35°;

wherein the vertically active interlock system furthermore comprises contact faces between the downwardly pointing locking element and the lip of the bottom hook-shaped part, wherein the contact faces are only situated on a half of said female coupling part which lies closest to the upwardly pointing locking element;

wherein the contact faces of the vertically active interlock system are situated on a part of the female coupling part which is situated at a distance from an upper edge of the panel edge with the female coupling part, wherein this distance is at least 20 percent of a thickness of the floor panel.

2. The floor panel of claim 1, wherein a tangent determined by said first locking zone forms an angle with the horizontal which is less than 60°.

3. The floor panel of claim 1, wherein a tangent determined by said second locking zone forms an angle with the horizontal which is less than 60°.

4. The floor panel of claim 1, wherein a tangent determined by said first locking zone forms an angle with the horizontal which is less than 60°;

wherein the tangent determined by said second locking zone forms an angle with the horizontal which is less than 60°; and wherein the angle between the tangent at said second locking zone and the horizontal is greater than the angle between the tangent determined by said first locking zone and the horizontal.

5. The floor panel of claim 1, wherein said contact faces of the vertically active interlock system are situated on a part of the female coupling part which is situated at a distance from an upper edge of the panel edge with the female coupling part, wherein this distance is at least half the distance between the upper edge and the contact faces of the horizontally active interlock system.

6. The floor panel of claim 1, wherein the proximate-most located point of said recess is distal from the lowest point of the contact faces, such that said theoretical line runs from said the proximate-most located point of said recess inwardly to the lowest point of the contact faces.

7. The floor panel of claim 1, wherein the proximate-most located point of said recess is proximate from the lowest point of the contact faces such that said theoretical line runs from said the proximate-most located point of said recess outwardly to the lowest point of the contact faces.

8. The floor panel of claim 1, wherein the male part, during said downward movement, is arranged to be brought without deformation into the female part to a position in which the downwardly pointing locking element makes contact with the upwardly pointing locking element;

wherein this contact on the upwardly pointing locking element is located above said contact faces which are formed in the coupled state.

9. The floor panel of claim 8, wherein the first pair of mutually opposing edges are provided with chamfers.

10. The floor panel of claim 9, wherein the chamfers are formed by impressions.

11. The floor panel of claim 8, wherein the floor panel has a substrate and a decorative top layer, wherein the substrate comprises plastic-based material, foamed or not foamed, resilient or hard, with or without plasticizer, filled or not filled with chalk, lime, talc or ground stone-based fillers.

12. The floor panel of claim 11, wherein the plastic comprises polypropylene (PP), polyethylene (PE), polyethylene terephthalate (PET), polyurethane (PUR), polyvinyl chloride (PVC) or polyisocyanurate (PIR).

13. The floor panel of claim 8, wherein the floor panel has a substrate and a decorative top layer, wherein the substrate comprises wood-based material.

* * * * *